US006886245B1

(12) United States Patent
Mäki et al.

(10) Patent No.: US 6,886,245 B1
(45) Date of Patent: May 3, 2005

(54) METHOD FOR MANUFACTURING MOBILE ELECTRONIC DEVICES USING A COMMON ENGINE ASSEMBLY

(75) Inventors: Jouni Mäki, Muurla (FI); Jussi Hakunti, Piispanristi (FI)

(73) Assignee: Nokia Corporation, Espoo (FI)

( * ) Notice: Subject to any disclaimer, the term of this patent is extended or adjusted under 35 U.S.C. 154(b) by 106 days.

(21) Appl. No.: 09/986,592

(22) Filed: Nov. 9, 2001

(51) Int. Cl.⁷ ................................................ H05K 3/30
(52) U.S. Cl. ........................ 29/832; 29/622; 455/575.1
(58) Field of Search ...................... 29/622, 832; 345/98; 379/173, 428.03–428.13; 355/575.1–575.8, 19.3; 455/19.3, 575.1–575.8; 361/807, 814

(56) References Cited

U.S. PATENT DOCUMENTS 4,845,772 A  *  7/1989  Metroka et al. ....... 379/433.13
5,867,140 A  *  2/1999  Rader ........................... 345/98
5,911,121 A  *  6/1999  Andrews .................... 455/418

* cited by examiner

Primary Examiner—A. Dexter Tugbang
Assistant Examiner—Donghai D. Nguyen
(74) Attorney, Agent, or Firm—Antonelli, Terry, Stout & Kraus, LLP

(57) ABSTRACT

A technique for manufacturing a mobile electronic device includes providing an engine assembly including electronic components and software contained therein and then selectively providing one of either a monoblock cover assembly including a fixed front cover and a mating back cover or a flip type cover assembly including a front cover having a hinged flip cover and a mating back cover and then disposing the engine assembly within the selectively provided one of the monoblock cover assembly or flip type cover assembly. A detector switch may be mounted on the flip cover to detect whether or not the flip cover is open and may be mounted so as to be opposite pads disposed on the engine assembly, the pads being electrically connected to the detector switch upon the assembly of the mobile electronic device.

34 Claims, 5 Drawing Sheets

210

220

230

240 understanding US 6,886,245 B1

METHOD FOR MANUFACTURING MOBILE ELECTRONIC DEVICES USING A COMMON ENGINE ASSEMBLY

BACKGROUND OF THE INVENTION

1. Field of the Invention

The present invention relates to a technique for manufacturing a mobile electronic device and a mobile electronic device manufactured in accordance with the method and more particularly, the present invention relates to a technique for manufacturing a mobile electronic device, such as a mobile telephone, and a mobile electronic device manufactured in accordance with the method in which both a mobile electronic device having a monoblock configuration and a mobile electronic device having a hinged flip cover may be manufactured using the same engine and software.

2. Description of the Related Art

Presently, mobile telephones are being manufactured in two basic configurations, namely, a monoblock configuration in which the keypad and display of the telephone are exposed at all times and a flip phone configuration in which a hinged flip cover is used to cover the keypad and in some cases also the display of the telephone. Since both of these configurations are popular with consumers, it has been necessary to manufacture both of these configurations.

At present, each configuration requires a different engine and software, requiring the manufacturer to manufacture and inventory two different engines. Since the cost of manufacturing the engines is very volume sensitive, that is, the cost per unit decreases as the number of units increases, the cost per unit for manufacturing two different engines is considerably higher than the cost per unit for manufacturing a single engine.

SUMMARY OF THE INVENTION

In order to reduce the per unit cost of manufacture, is therefore an object of the present invention to provide a technique for manufacturing a mobile electronic device, such as a mobile telephone, in which the same engine and software may be used to manufacture both a mobile electronic device having a monoblock configuration and a mobile electronic device having a hinged flip cover using the same engine and software.

More particularly, it is an object of the present invention to provide a method of manufacturing a mobile electronic device and a mobile electronic device manufactured in accordance with the method, the method including: providing an engine assembly having electronic components and software contained therein; selectively providing one of either a monoblock cover assembly including a fixed front cover and a mating back cover or a flip type cover assembly including a front cover having a hinged flip cover and a mating back cover; and disposing the engine assembly within the selectively provided one of the monoblock cover assembly or flip type cover assembly.

It is also an object of the present invention to manufacture a mobile electronic device and a mobile electronic device manufactured in accordance with the method as above but further including mounting a detector switch on the flip cover, the detector switch being mounted so as to be opposite pads disposed on the engine assembly, the pads being electrically connected to the detector switch upon the assembly of the mobile electronic device.

It is further an object of the present invention to manufacture a mobile electronic device and a mobile electronic device manufactured in accordance with the method as above in which the mobile electronic device is turned on only upon the hinged flip cover of the flip type cover assembly being opened upon providing the flip type cover assembly.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and that the present invention is not limited thereto. The spirit and scope of the present invention are limited only by the terms of the appended claims.

The following represents brief descriptions of the drawings, wherein.

DETAILED DESCRIPTION

Figure 1:
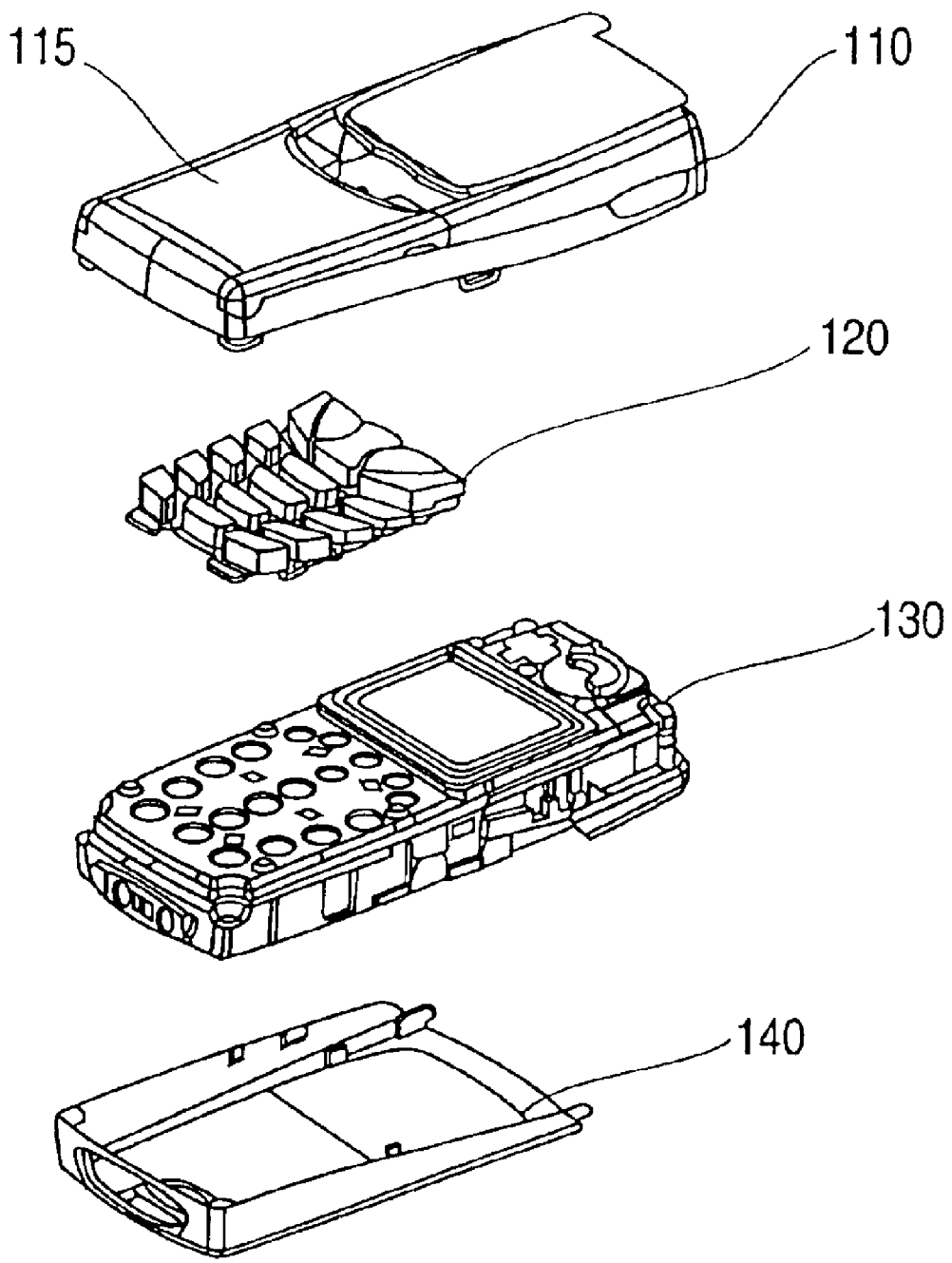
FIG. 1 is an exploded view of a mobile electronic device, such as a mobile telephone, having a flip type cover assembly.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto.

Furthermore, although example embodiments of the present invention will be described with respect to a mobile telephone, the present invention is not limited thereto. For example, the present invention also applies to other mobile electronic devices, such as PDAs (Personal Digital Assistants).

FIG. 1 is an exploded view of a mobile electronic device, such as a mobile telephone, having a flip type cover assembly. An engine 130, containing electronic circuitry and power source (e.g.-a battery) and software stored therein, is disposed between a back cover 140 and a front cover 110 having a flip cover 115. A keypad 120 is disposed between the front cover 110 and the engine 130. Various means may be used to electrically connect the keypad 120 to the engine 130 including wires and mating electrical connecting pads.

Figure 2:
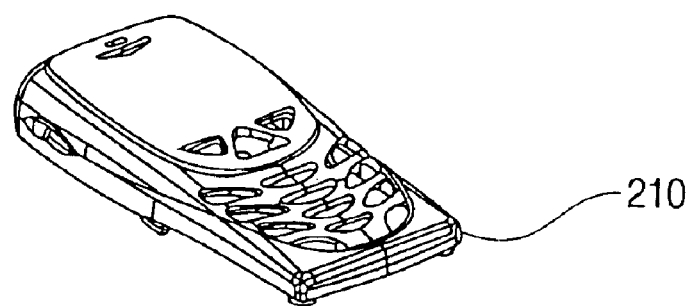
FIG. 2 is an exploded view of a mobile electronic device, such as a mobile telephone, having a monoblock type cover assembly.
Figure 2:
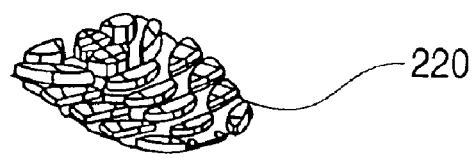
Figure 2:
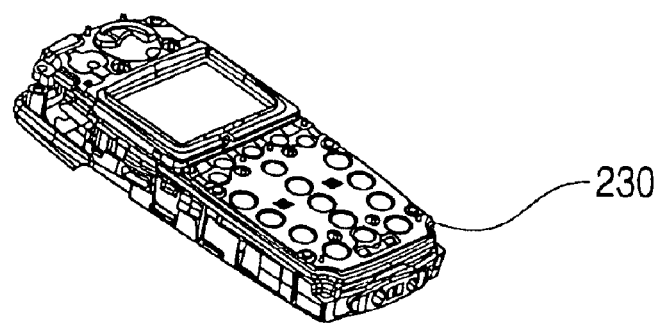
Figure 2:
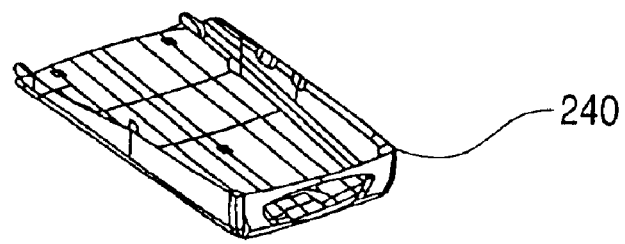

FIG. 2 is an exploded view of a mobile electronic device, such as a mobile telephone, having a monoblock type cover assembly. As with the device of FIG. 1, an engine 230, containing electronic circuitry and a power source and software stored therein, is disposed between a back cover 240 and a front cover 210 of the monoblock type (that is, without a flip type cover assembly). A keypad 220 is disposed between the front cover 210 and the engine 130 and is electrically connected to the engine 130.

In earlier arrangements, the engine 130 and the engine 230 were not identical, necessitating the manufacturing and inventorying of two different engines containing two different software programs stored therein, thereby increasing manufacturing costs.

Figure 3:
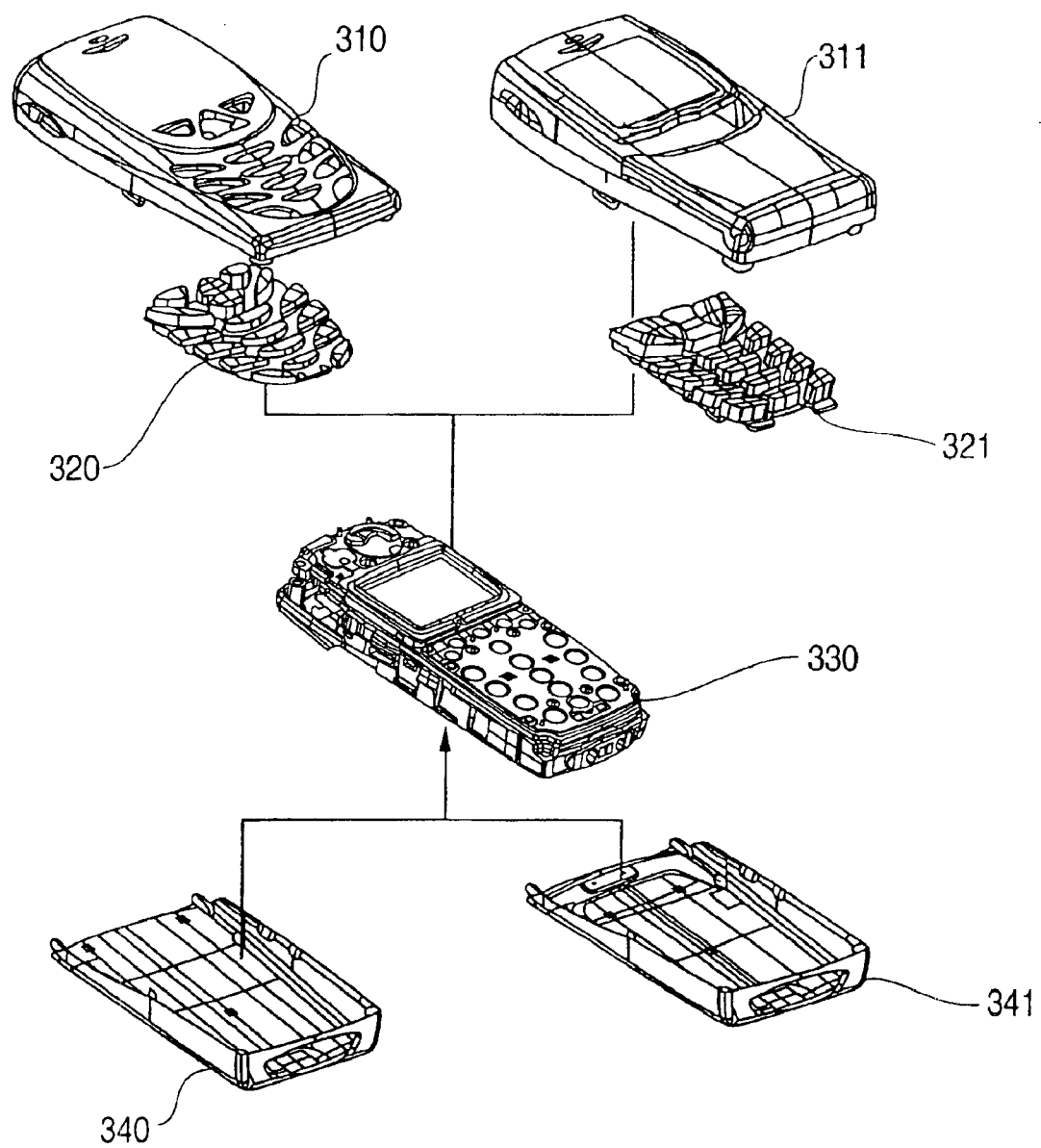
FIG. 3 is an exploded view of elements used in manufacturing a mobile electronic device, such as a mobile telephone, in accordance with an embodiment of the present invention.

FIG. 3 is an exploded view of elements used in manufacturing a mobile electronic device, such as a mobile telephone, in accordance with an embodiment of the present invention. A single engine 330, containing electronic circuitry and a power source and software stored therein may be used in constructing both an electronic device having a flip type cover assembly and an electronic device having a monoblock type cover assembly.

If an electronic device having a flip type cover assembly is to be manufactured, the engine 330 is disposed between a back cover 341 and a front cover 311 having a flip type cover assembly. A keypad 321 is disposed between the engine 330 and the front cover 311 and is electrically connected to the engine 330.

Alternatively, if an electronic device having a monoblock type cover assembly is to be manufactured, the engine 330 is disposed between a back cover 340 and a front cover 310. A keypad 320 is disposed between the engine 330 and the front cover 310 and is electrically connected to the engine 330.

By manufacturing a mobile electronic device in accordance with the present invention, it is only necessary to manufacture and inventory a single engine containing a single software program, thereby decreasing manufacturing costs.

Figure 4:
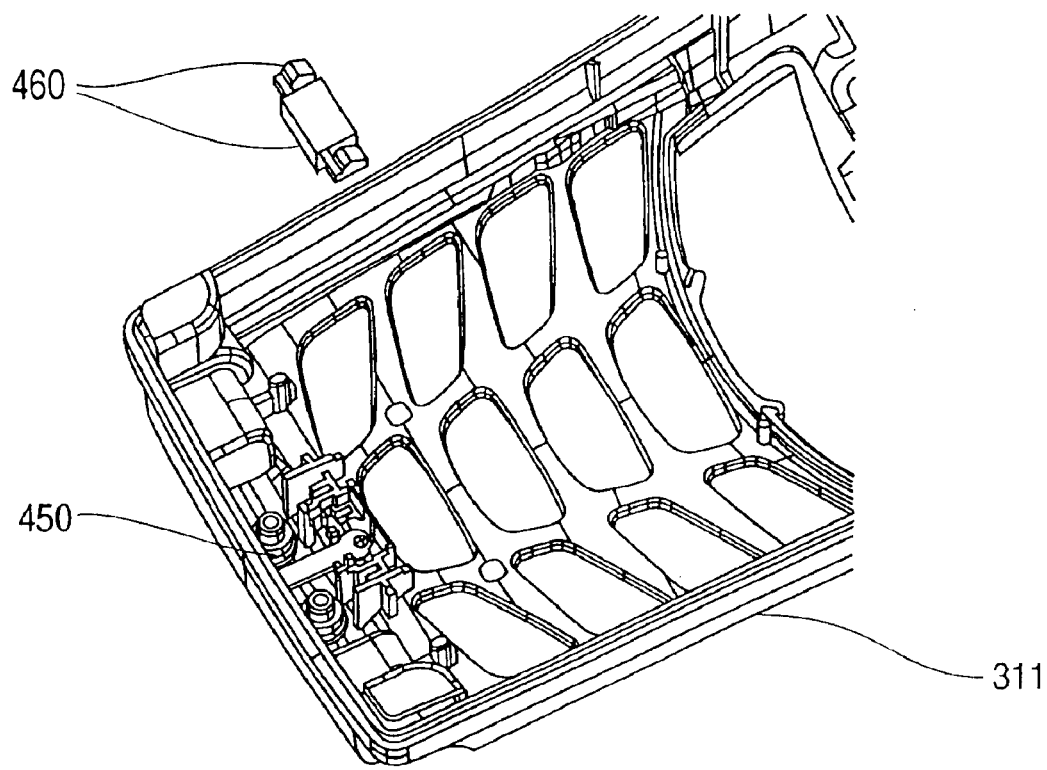
FIG. 4 is a partial view of a flip cover of a flip type cover assembly of a mobile electronic device, such as a mobile telephone, in accordance with an embodiment of the present invention.
Figure 5:
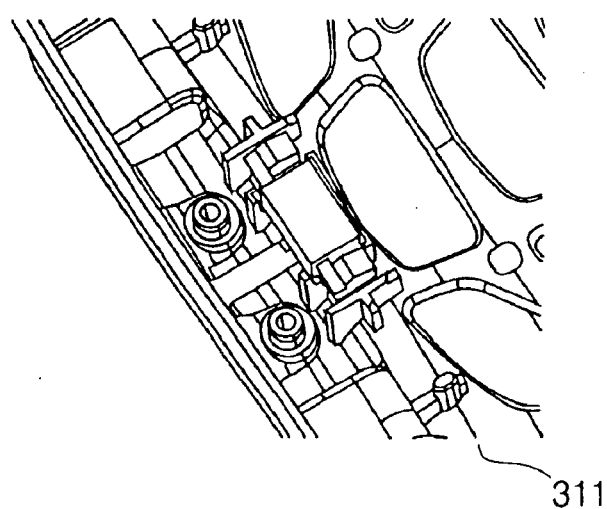
FIG. 5 is a partial view of the flip type cover assembly of FIG. 4.
Figure 6:
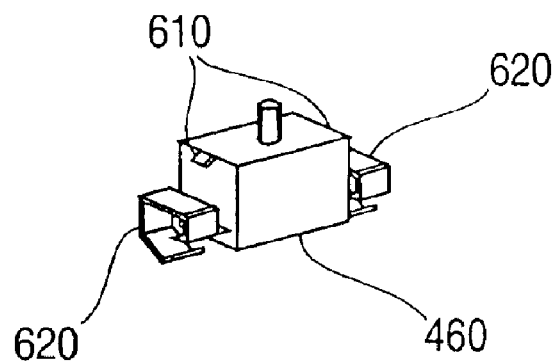
FIG. 6 illustrates a detector switch of the flip type cover assembly of FIG. 4.
Figure 7:
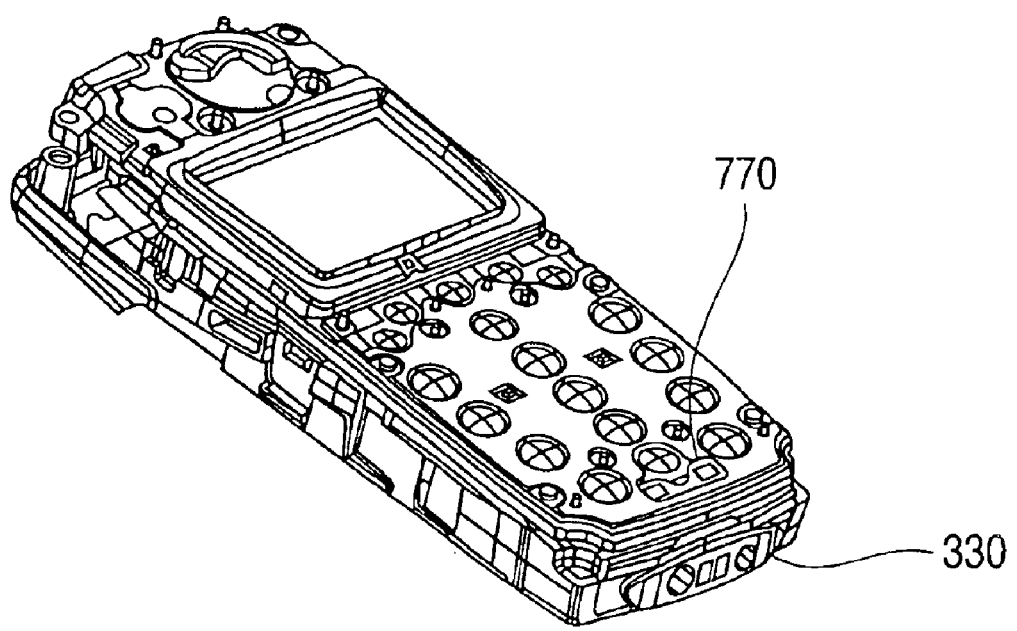
FIG. 7 illustrates an engine assembly of a mobile electronic device, such as a mobile telephone, in accordance with an embodiment of the present invention.

FIG. 4 is a partial view of a flip cover of a flip type cover assembly of a mobile electronic device, such as a mobile telephone, in accordance with an embodiment of the present invention. FIG. 5 is a partial view of the flip type cover assembly of FIG. 4. FIG. 6 illustrates a detector switch of the flip type cover assembly of FIG. 4. FIG. 7 illustrates an engine assembly of a mobile electronic device, such as a mobile telephone, in accordance with an embodiment of the present invention.

As shown in FIGS. 4 and 5, it is often desirable to dispose a detector switch 460 on the front cover 311 so as to sense whether the flip cover is open or closed. The detector switch 460, having mounting clips 610 and spring type elements 620 for electrically connecting the switch 460 to the engine 330, is affixed to the cover 311 so that the spring type elements 620 electrically contact electrical pads 770 disposed on the engine 330 to electrically connect the switch 460 to the engine 330.

The electrical pads 770 are disposed on the engine 330 and are not used when the engine 330 is assembled in an electronic device having a monoblock type cover.

In an embodiment of the present invention, the electronic device is turned on only when the detector switch 460 has detected that the flip cover is open. This is opposite from the usual arrangement and results in an increased standby time.

This concludes the description of the example embodiment. All the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of manufacturing multiple types of mobile electronic devices having a monoblock cover assembly and mobile electronic devices having a flip cover assembly using a common engine assembly comprising:

providing common engine assemblies including electronic components and software contained therein which are used in manufacturing of the mobile electronic devices;

providing monoblock cover assemblies each including a fixed front cover assembly and a mating back cover and flip cover assemblies each including a front cover having a hinged flip cover and a mating back cover for the manufacture of the multiple types of mobile electronic devices; and disposing individual provided common engine assemblies, including electronic components and software, within individual provided monoblock cover assemblies and disposing individual provided common engine assemblies within individual provided flip cover assemblies to respectively manufacture the mobile electronic devices having a monoblock cover assembly and a flip cover assembly.

2. The method of claim 1, comprising mounting a detector switch on the hinged flip cover to detect whether or not the hinged flip cover is open, and wherein the detector switch is electrically connected to the common engine assembly of the flip cover assembly.

3. The method of claim 1, comprising detecting whether or not the hinged flip cover of the flip cover assembly is open and turning on one of the mobile electronic devices only upon the detection that the hinged flip type cover has been opened.

4. The method of claim 2, wherein the mobile electronic device comprise a PDA (Personal Digital Assistant).

5. The method of claim 1, comprising mounting a detector switch on the hinged flip cover to detect whether or not the hinged flip cover is open, and wherein the detector switch is mounted so as to be opposite pads disposed on the common engine assembly with the pads being electrically connected to the detector switch of the flip cover assembly.

6. The method of claim 5, wherein the mobile electronic device comprise a mobile telephone.

7. The method of claim 5, wherein the mobile electronic device comprise a PDA (Personal Digital Assistant).

8. The method of claim 2, wherein the mobile electronic device comprise a mobile telephone.

9. The method of claim 8, wherein the mobile electronic device comprise a mobile telephone.

10. The method of claim 8, wherein the mobile electronic device comprise a PDA (Personal Digital Assistant).

11. The method of claim 1, comprising providing a keypad disposed between the engine assembly and the fixed front cover of the monoblock cover assemblies and the front cover of the flip type cover assemblies.

12. The method of claim 11, comprising providing a keypad disposed between the engine assembly and the front cover of the type cover assemblies with the hinged flip cover covering the keypad upon being closed.

13. The method of claim 12, wherein the mobile electronic device comprise a mobile telephone.

14. The method of claim 12, wherein the mobile electronic device comprise a PDA (Personal Digital Assistant).

15. The method of claim 11, wherein the mobile electronic device comprise a mobile telephone.

16. The method of claim 11, wherein the mobile electronic device comprise a PDA (Personal Digital Assistant).

17. The method of claim 1, wherein the mobile electronic device comprise a mobile telephone.

18. The method of claim 1, wherein the mobile electronic device comprise a PDA (Personal Digital Assistant).

19. A mobile electronic devices manufactured in accordance with a method of manufacturing multiple types of mobile electronic devices having a monoblock cover assembly and mobile electronic devices having a flip cover assembly using a common engine assembly comprising:

providing common engine assemblies including electronic components and software contained therein which are used in manufacturing of the mobile electronic devices;

providing monoblock cover assemblies each including a fixed front cover assembly and a mating back cover and flip cover assemblies each including a front cover having a hinged flip cover and a mating back cover for the manufacture of the multiple types of mobile electronic devices; and disposing individual provided common engine assemblies, including electronic components and software, within individual provided monoblock cover assemblies and disposing individual provided common engine assemblies within individual provided flip cover assemblies to respectively manufacture the mobile electronic devices having a monoblock cover assembly and a flip cover assembly.

20. The devices of claim 19, comprising mounting a detector switch on the hinged flip cover to detect whether or not the hinged flip cover is open, and wherein the detector switch is electrically connected to the common engine assembly of the flip cover assembly.

21. The devices of claim 20, wherein the mobile electronic device comprises a mobile telephone.

22. The devices of claim 20, wherein the mobile electronic device comprises a PDA (Personal Digital Assistant).

23. The devices of claim 19, comprising mounting a detector switch on the hinged flip cover to detect whether or not the hinged flip cover is open, and wherein the detector switch is mounted so as to be opposite pads disposed on the common engine assembly with the pads being electrically connected to the detector switch of the flip type cover assembly.

24. The devices of claim 23, wherein the mobile electronic device comprises a mobile telephone.

25. The devices of claim 23, wherein the mobile electronic device comprises a PDA (Personal Digital Assistant).

26. The devices of claim 19, comprising detecting whether or not the hinged flip cover of the flip type cover assembly is open and turning on one of the mobile electronic devices only upon the detection that the hinged flip cover has been opened.

27. The devices of claim 26, wherein the mobile electronic device comprises a mobile telephone.

28. The devices of claim 26, wherein the mobile electronic device comprises a PDA (Personal Digital Assistant).

29. The devices of claim 19, comprising providing a keypad disposed between the engine assembly and the fixed front cover of the monoblock cover assemblies and the front cover of the flip type cover assemblies.

30. The devices of claim 29, wherein the mobile electronic device comprises a PDA (Personal Digital Assistant).

31. The devices of claim 19, comprising providing a keypad disposed between the engine assembly and the front cover of the flip type cover assemblies with the hinged flip cover covering the keypad upon being closed.

32. The devices of claim 31, wherein the mobile electronic device comprises a PDA (Personal Digital Assistant).

33. The devices of claim 19, wherein the mobile electronic device comprises a mobile telephone.

34. The devices of claim 19, wherein the mobile electronic device comprises a PDA (Personal Digital Assistant).

* * * * *